United States Patent Office 3,235,600
Patented Feb. 15, 1966

3,235,600
REDUCTION OF DIAMINOCYCLOHEXANE CONCENTRATION IN CRUDE HEXAMETHYLENEDIAMINE
Phillip W. Evans, Pensacola, Fla., assignor to Monsanto Company, a corporation of Delaware
No Drawing. Filed Nov. 28, 1962, Ser. No. 240,742
4 Claims. (Cl. 260—583)

This invention relates to the production of amines and more particularly, it relates to a process for the production of amines in a high degree of purity.

Hexamethylenediamine is now a well-known compound which may be prepared on a commercial scale most conveniently by catalytically hydrogenating adiponitrile in the presence of ammonia. A principal use of hexamethylenediamine involves condensing it with dibasic acids to produce polyamides, and in manufacturing these polyamides, important advantages are obtained by reacting the diamine in a first step with an equivalent amount of dibasic carboxylic acid to form a salt using a solvent such as water, methanol or ethanol in accordance with procedures well known in the art. This salt thus prepared is subsequently converted in a second step to the polyamide condensation product.

Although there are a number of methods for the preparation of hexamethylenediamine which are known and used in industry, none of these methods result in the production of hexamethylenediamine which is free from products of side reactions and the like. Consequently, further refinement of the crude hexamethylenediamine produced is necessary generally to obtain a product which exhibits the high degree of purity necessary when the hexamethylenediamine is to be used in industrial processes which culminate in the production of commercially saleable articles. This is especially true, for example, in the production of polyamides wherein hexamethylenediamine is reacted with adipic acid to produce polyhexamethylene adipamide which is used in many end products.

Utilization of poorly refined hexamethylenediamine in the production of polyhexamethylene adipamide causes a restriction of the molecular weight, results in a polymer having bad color characteristics and poor dyeability, and affects various other physical and chemical properties of the polymer or products made therefrom. For example, in the textile field where polyhexamethylene adipamide is used widely for the production of filaments and fibers, the use of poorly refined hexamethylenediamine results in weak filaments and fibers, as well as ones having poor color characteristics which do not meet the stringent textile standards.

One process currently in wide use throughout industry for the production of hexamethylenediamine is the hydrogenation of adiponitrile in the presence of a catalyst such as cobalt. This process is generally operated on a continuous basis by passing hydrogen and adiponitrile over or through a catalyst under conditions of elevated pressure and temperature. Liquid ammonia is added to the process to absorb exothermic heat of reaction and to limit the formation of unwanted by-products. After the crude product is formed, unwanted by-products may be removed by passing the crude product through a series of distillation stills or by chemical treatments or combinations of these methods.

It is well known in the art that the catalytic hydrogenation of adiponitrile under commercially attractive conditions results in the formation of very small amounts of the compound 1,2-diaminocyclohexane along with the desired product, hexamethylenediamine, and that the presence of this cyclic compound, even in very minute quantities, has a drastic and critically adverse effect on the quality and color stability of the polyamide product resulting from the polycondensation of hexamethylenediamine with dibasic carboxylic acids. The 1,2-diaminocyclohexane gives rise to salt solutions of hexamethylenediamine and dibasic carboxylic acids which have poor and variable color, and the polyamides prepared from these salt solutions not only have poor color but also are characterized by irregular tensile strength and nonuniform dyeing properties.

Although one major cause for polyamide product quality, color, and dyeing problems has been ascertained and explained, the saisfactory removal on a commercial scale of the small amounts of 1,2-diaminocyclohexane present in manufactured crude hexamethylenediamine to eliminate the cause presents a difficult problem. According to present commercial practices, the 1,2-diaminocyclohexane is removed from the hexamethylenediamine by fractional distillation; however, because of the proximity of the boiling points of 1,2-diaminocyclohexane and hexamethylenediamine, a fractional distillation process designed to separate these compounds must of necessity be one which is capable of separating constituents whose volatilities are in the same order of magnitude. Distillation processes that meet this requirement are known to be not too efficient and to be extremely expensive to operate. Moreover, to effect the desired removal of the 1,2-diaminocyclohexane by fractional distillation, there are attending losses in the prime product, hexamethylenediamine, and the apparatus to perform the distillations is expensive to install and in most instances, presents a major bottleneck to increased output from continuous processes for the production of refined hexamethylenediamine.

It is, therefore, an object of this invention to provide an improved hexamethylenediamine composition and to provide a process for preparing this composition.

Another object of this invention is to provide a process for the preparation of highly purified hexamethylenediamine.

A further object is to provide a process for the catalytic hydrogenation of adiponitrile to hexamethylenediamine wherein the production of the by-product, 1,2-diaminocyclohexane, is suppressed.

These and other objects of this invention will be apparent from the description hereinafter.

In accordance with this invention, it has been discovered that the above and other objects are accomplished by catalytically hydrogenating a nitrile under controlled conditions of temperature and pressure in the presence of ammonia and at least one of the group of compounds comprising organic and inorganic carbonates, organic and inorganic carbamates, and carbon dioxide.

In a particular preferred embodiment of the invention, a mixture of adiponitrile, ammonia, hydrogen, and at least one of the group of compounds comprising organic and inorganic carbonates, organic and inorganic carbamates, and carbon dioxide is passed over or through a hydrogenation catalyst under conditions of elevated temperature and pressure, whereby crude hexamethylenediamine containing a suppressed quantity of the hydrogenation by-product, 1,2-diaminocyclohexane, is produced.

The nitrile which is employed may be derived from any suitable source and when adiponitrile is used it may be obtained from the reaction of adipic acid with ammonia, the reaction of dichlorobutane with hydrogen cyanide, the hydrogenation of dicyanobutene, or other known means for the preparation thereof and should be of the degree of purity well known in the art.

The hydrogenation of the nitrile to the amine may be effected by using various hydrogenation catalysts such as nickel, cobalt, copper, zinc, platinum, palladium, rubidium, ruthenium, and the like; and these elements, either in the form of free metals or in the form of compounds such as the oxides or salts, may be employed, if desired, in conjunction with known promoters and/or supports.

For the hydrogenation of adiponitrile to hexamethylenediamine, cobalt catalysts and in particular catalysts comprising cobalt oxide are preferred.

These above mentioned catalytic materials are used preferably in a finely divided form and may be deposited on a porous supporting means such as pumice, kieselguhr, alumina gel and silica gel. Catalyst powders are prepared conveniently for use in the hydrogenation process by compressing the catalyst into pellets or brickets of suitable size. Stabilized catalysts containing a substantial proportion of oxide, catalysts comprising the carbonate, oxide or hydroxide of the hydrogenating metal deposited on an inert porous support, and catalysts in which the hydrogenating metal is combined with a non-reducible oxide are preferably reduced in a stream of hydrogen-containing gas prior to exposure to the reaction compounds.

The temperature for the hydrogenation may be between 25° C. and 200° C. and the hydrogen pressure may be maintained between 25 and 10,000 pounds per square inch or higher. In the practice of the invention it is preferred generally to carry out the hydrogenation at the lowest temperature and hydrogen pressure at which hydrogen is absorbed at a reasonably rapid rate. The temperature in turn is dependent to a large extent upon what nitrile is being hydrogenated, and in the preferred example of the hydrogenation of adiponitrile, the temperature may be between 120° C. and 170° C. and the hydrogen pressure may be between 4000 and 6000 pounds per square inch gauge.

The hydrogenation by-product suppressant compound or compounds used in the process of this invention may be one or more of the group of compounds comprising organic and inorganic carbonates, organic and inorganic carbamates, and carbon dioxide. The choice of the by-product suppressant compound or compounds is dependent upon the nitrile which is being hydrogenated, the amine being produced from the hydrogenation, and the by-products normally produced from the hydrogenation process. It is clear that those compounds which will not present additional problems in the purification of the crude amine produced should be used whenever possible, and generally it may be most economical and advantageous to use the carbonate or carbamate of the desired hydrogenation amine product or the carbonate or carbamate of a non-deleterious by-product of the hydrogenation process as the deleterious by-product suppressant compound to be added to the hydrogenation process feed stream. An example of the hydrogenation of adiponitrile to hexamethylenediamine, hexamethylenediamine carbonate or a non-deleterious by-product carbamate, aminocapronitrile carbamate, may be used as the deleterious by-product 1,2 diaminocyclohexane suppressant.

The organic or inorganic carbonate and the organic or inorganic carbamate which is used as the deleterious by-product suppressant may be prepared by any means well known in the art and as an example, the hexamethylenediamine cabamate or the aminocapronitrile carbamate may be prepared by bubbling or sparging carbon dioxide through molten hexamethylenediamine or aminocapronitrile, respectively, until no further heat is obtained from the exothermic reaction between the organic compound and the carbon dioxide. Other organic and inorganic compounds to be used as deleterious by-product suppressants may be prepared in a similar manner or by other means well known to those skilled in the art.

The hydrogenation process of this invention may be performed either as a batch or a continuous process, and the contacting of the hydrogenation reactants, heat transfer compounds, and by-product suppressants, with catalyst or catalysts and with each other may be in the liquid phase or the vapor phase or a combination thereof depending upon the hydrogenation reactants and the desired conditions of temperature and pressure for the hydrogenation. The hydrogenation reactants, the ammonia, and the deleterious by-product suppressant may be fed separately to the catalyst or catalysts for contacting or any two or more of the components may be mixed with each other prior to their contacting the catalyst. In the example of the hydrogenation of adiponitrile to hexamethylenediamine, is has been found advantageous to mix the hexamethylenediamine carbonate or aminocapronitrile carbamate or combinations of these with the adiponitrile or the ammonia or combinations of these prior to the contacting of the resultant mixture with the hydrogen and the catalyst or catalysts. Water may be present in one or more of the components of the hydrogenation feed stream to the catalyst or catalysts without affecting the beneficial results obtained from the deleterious by-product suppressant compound.

The following examples are intended to illustrate the present invention more fully but are not to be construed as limiting the scope thereof, for clearly it is possible to effect many modifications thereof.

EXAMPLE I

In a pressure vessel, one hundred twelve (112) pounds of adiponitrile were pressured to two hundred (200) p.s.i.g. with nitrogen and then transferred by gravity to a stirred pressure vessel containing ninety-five (95) gallons (approximately four hunderd fifty (450) pounds) of liquid ammonia under two hundred (200) p.s.i.g. pressure. After blending the liquid ammonia and adiponitrile for one (1) hour, the blended mixture was pumped continuously from a feed tank in a line at four thousand five hundred (4500) p.s.i.g. where it was mixed with sufficient hydrogen, also at a pressure of 4500 p.s.i.g., to provide a ratio of seventy (70) standard cubic feet of hydrogen per pound of adiponitrile. This blend of hydrogen, ammonia, and adiponitrile was preheated and fed continuously up through a sintered pelleted cobalt catalyst in a hydrogenation vessel at a feed rate of three (3) pounds of adiponitrile per hour. The catalyst temperature was varied between 125° C. and 150° C. to maintain a constant adiponitrile concentration in the hydrogenation vessel effluent stream. After cooling, the excess hydrogen was separated from the product, then the pressure reduced to atmospheric and the excess ammonia was separated from the product. Samples of this crude hexamethylenediamine product so produced were taken every four hours during the run, and laboratory analysis thereof showed one thousand fifty (1,050) parts per million 1,2-diaminocyclohexane in the crude hexamethylenediamine product.

EXAMPLE II

The continuous hydrogenation of adiponitrile to hexamethylenediamine was continued by the process and in the apparatus described in Example I. All conditions and procedures remained the same except that a new batch of feed was prepared by adding 0.10 percent by weight or 0.112 pounds of hexamethylenediamine carbonate to the one hunderd twelve (112) pounds of adiponitrile prior to its being mixed with the liquid ammonia. Samples of the crude hexamethylenediamine product were taken every four (4) hours during this run and laboratory analysis thereof showed eight hundred fifty (850) parts per million 1,2-diaminocyclohexane in the crude hexamethylenediamine product or a 19 percent reduction in the 1,2-diaminocyclohexane produced.

EXAMPLE III

Additional runs were made according to the procedure of Examples I and II with and without the deleterious by-product suppressant, hexamethylenediamine carbonate, at the same and different concentrations of that of Example II, and the results of these comparison runs are shown in Table 1 below.

Table 1

| Run | Percent Suppressant in Feed | Percent Reduction in 1,2-diaminocyclohexane Produced |
| --- | --- | --- |
| 2 | 0.10 | 14.3 |
| 3 | 0.15 | 22.3 |
| 4 | 0.18 | 35.5 |
| 5 | 0.50 | 30.6 |
| 6 | 0.02 | 20.0 |

EXAMPLE IV

Another series of test runs were made using the apparatus, conditions, and procedures described in Examples I and II, except that aminocapronitrile carbamate was used as the suppressant instead of hexamethylenediamine carbonate. The results of this series of comparison runs are shown in Table 2 below.

Table 2

| Run | Percent Suppressant in Feed | Percent Reduction in 1,2-diaminocyclohexane Produced |
| --- | --- | --- |
| 1 | 0.05 | 33.5 |
| 2 | 0.10 | 35.7 |
| 3 | 0.10 | 24.0 |
| 4 | 0.10 | 26.5 |
| 5 | 0.15 | 19.5 |

EXAMPLE V

A run was made using the apparatus, conditions, and procedures of Examples I and II except that a mixture of 0.1% by weight of the adiponitrile of hexamethylenediamine carbonate and 0.1% by weight of the adiponitrile of aminocapronitrile carbamate was added to the adiponitrile as the 1,2-diaminocyclohexane suppressant. Laboratory analysis of the samples of the crude hexamethylenediamine product taken before and after the addition of this suppressant to the feed showed that a 32.0 percent reduction in the 1,2-diaminocyclohexane produced was obtained.

Prior to this invention, it was known that the continuous hydrogenation of adiponitrile to hexamethylenediamine by commercial processes which were economical and satisfactory produced a crude hexamethylene containing certain impurity by-products as shown in Table 3 below, wherein all percents are by weight unless otherwise specified.

Table 3

CRUDE HEXAMETHYLENEDIAMINE

Compound: Concentration
- Hexamethylenediamine __percent__ 96.60 to 98.60
- Water __do__ 0.20 to 0.70
- Hexamethyleneimine __do__ 0.25 to 0.55
- Adiponitrile __do__ 0.01 to 0.11
- Aminocapronitrile __do__ 0.09 to 0.21
- Bis-hexamethylenetriamine [1] __do__ 0.50 to 1.80
- 1,2-diaminocyclohexane __p.p.m.[2]__ 800 to 1,600

[1] Contains other high boiling polymericamines.
[2] Parts per million.

The impurity by-product materials shown in the above table, except for the 1,2-diaminocyclohexane, may be removed easily from the hexamethylenediamine by simple fractionation in a distillation process which removes the hexamethyleneimine as a first cut overhead, then fractionates the product, hexamethylenediamine, and leaves the aminocapronitrile and other high boiling polymeric amines, the lowest boiling of which is bishexamethylenetriamine, as a residue. This type of distillation process is completely unsatisfactory to remove the 1,2-diaminocyclohexane in that if sufficient 1,2-diaminocyclohexane is removed by this process to the extent necessary to prevent deleterious effects on the color and strength properties of polyamides prepared from the hexamethylenediamine, 250 parts per million maximum, thirty (30) to thirty-five (35) percent of the hexamethylenediamine will be lost also in the process. To overcome this, the 1,2-diaminocyclohexane may be separated from the hexamethylenediamine fractionated, as above, by a subsequent distillation, carried out either batchwise or continuously, employing a fractionation process capable of separating constituents having a ratio of vapor pressures of two (2) or less.

It is clear that a fractionation process capable of separating constituents having a ratio of vapor pressures of two or less in a process that is both expensive and time-consuming to operate.

The present invention presents many advantages over presently employed methods of manufacture of refined hexamethylenediamine. It results in the preparation of hexamethylenediamine having a greatly reduced concentration of diaminocyclohexane. Furthermore, no great procedural changes in the preparation of the hexamethylenediamine are necessary since the deleterious by-product suppressant may be introduced into the hydrogenation process feed stream very simply by the addition of a single line. The crude hexamethylenediamine prepared in accordance with the process of this invention has approximately 25–30 percent less 1,2-diaminocyclohexane contained therein as a by-product and therefore greatly increased quantities of hexamethylenediamine may be processed through existing equipment in the same time as previously required or in the alternative, similar quantities of hexamethylenediamine may be manufactured with existing equipment in shorter periods of time. Numerous other advantages of this invention will be apparent to those skilled in the art.

As many apparently widely different embodiments of this invention may be made without departing from the spirit and scope thereof, it is to be understood that the same is not to be limited to the specific embodiments thereof, except as claimed in the appended claims.

I claim:

1. In the catalytic hydrogenation of adiponitrile to hexamethylenediamine at a temperature from 120 to 170° C. and at a pressure from 4,000 to 6,000 pounds per square inch gauge a method for reducing the amount of 1,2-diaminocyclohexane present in crude hexamethylenediamine formed by said catalytic hydrogenation comprising, in combination, contacting said adiponitrile during said catalytic hydrogenation with at least one compound capable of suppressing the formation of 1,2-diaminocyclohexane selected from the group consisting of hexamethylenediamine carbonate and aminocapronitrile carbamate.

2. The method of claim 1 wherein, based on the weight of adiponitrile present, the amount of compound capable of suppressing the formation of 1,2-diaminocyclohexane ranges from 0.02 percent to 0.50 percent.

3. The method of claim 1 wherein the compound capable of suppressing the formation of 1,2-diaminocyclohexane is hexamethylenediamine carbonate.

4. The method of claim 1 wherein the compound capable of suppressing the formation of 1,2-diaminocyclohexane is aminocapronitrile carbamate.

References Cited by the Examiner

UNITED STATES PATENTS

| 1,845,280 | 2/1932 | Jaeger. |
| 2,166,152 | 7/1939 | Howk _____ 260—583 |
| 2,776,315 | 1/1957 | Jefferson et al. _____ 260—583 |

CHARLES B. PARKER, *Primary Examiner.*